Patented June 11, 1935

2,004,663

UNITED STATES PATENT OFFICE 2,004,663

METHOD OF UTILIZING THE NITROGEN IN NITROSYL CHLORIDE

Oskar Kaselitz, Berlin, Germany

No Drawing. Application April 12, 1932, Serial No. 604,875. In Germany July 9, 1931

1 Claim. (Cl. 23—102)

My invention refers to means of utilizing the nitrogen available from nitrosyl chloride and more especially to the recovery therefrom of nitric acid. It is an object of my invention to render such recovery more efficient and less expensive than the methods hitherto used for the same purpose.

Nitrosyl chloride is obtained in considerable quantities when converting alkali metal chlorides into the corresponding nitrates by treating them with nitric acid or nitrous gases. As nitrosyl chloride cannot be utilized as such for the production of further amounts of alkali nitrates, it has been proposed to decompose it into chlorine and nitric oxide, separating the latter compound and using it with an addition of oxygen or air in the form of nitrous gases or, after absorption by water, in the form of nitric acid.

In the specification of U. S. Patent No. 1,899,123, a method is described of utilizing the nitrogen available in nitrosyl chloride, according to which the nitrosyl chloride is first decomposed by heating with or without the aid of a catalyst, whereupon the gas is rapidly cooled by an addition of oxygen or air. The gas mixture thus obtained, which consists of nitrogen dioxide, chlorine and but little undecomposed nitrosyl chloride, is cooled to liquefaction temperature in order to separate the nitrogen dioxide from the chlorine and such chlorine compounds as may be present.

In carrying out this method great quantities of gases must be heated to high temperatures and thereafter cooled down again, and consequently great cooling surfaces are required.

According to the present invention I may considerably reduce the cooling surfaces and avoid altogether the cooling to liquefaction temperatures by using a selective solvent, which readily dissolves nitrogen dioxide, while chlorine remains substantially undissolved.

A particularly useful solvent answering the above conditions is nitric acid. According to a preferred embodiment of my invention I conduct the gas mixture, from which nitrogen dioxide shall be separated, in counter-current to the washing liquors obtained by washing artificially produced potassium nitrate and consequently containing considerable quantities of dissolved potassium nitrate. In the course of the treatment according to the present invention these washing liquors are converted into more or less concentrated nitric acid in which some potassium nitrate is also dissolved, and can advantageously be used for the conversion of further amounts of potassium chloride into potassium nitrate.

When subjecting substantially pure nitrosyl chloride to the treatment according to the present invention the gas ultimately escaping is substantially pure chlorine or a mixture of chlorine and oxygen. If the cooling of the hot decomposition product of nitrosyl chloride is brought about by an addition of air, the gases also contain free nitrogen. On the other hand I may also use the decomposition gases obtained by heating nitrosyl chloride diluted with other gases which, if inert, also escape together with the chlorine.

Example

A current of nitrosyl chloride is decomposed into nitric oxide and chlorine by heating as is more particularly described in U. S. Patent 1,899,123 mentioned above, whereupon the mixture is rapidly cooled by adding air in the proportion of 3 volumes air to 4 volumes of the original nitrosyl chloride. The gas mixture is then passed in counter-current to a washing liquor obtained by washing artificial potassium nitrate. This liquor which contains 150 grs. $KNO_3$ 20 grs. $KCl$ and 50 grs. $HNO_3$ per litre is highly enriched in nitric acid during the washing of the gas current and can be withdrawn from the first absorption vessel in the form of a solution of $KNO_3$ in a 90 per cent nitric acid. This strongly acid liquid may be re-used in the conversion of fresh potassium chloride into potassium nitrate. The gas escaping from the last vessel is substantially pure chloride diluted with nitrogen and oxygen.

Wherever the terms "nitrosyl chloride" and "oxygen" are used in the claim affixed to this specification, they are intended to designate these substances irrespective of whether they are or are not diluted with other gases.

Various changes may be made in the details disclosed in the foregoing specification without departing from the invention or sacrificing the advantages thereof.

I claim:—

The method of recovering nitric acid from nitrosyl chloride and utilizing same in a cyclic process comprising heating nitrosyl chloride to decomposition temperature, rapidly cooling the gas mixture thus obtained by an addition of oxygen, passing a liquor obtained by washing artificial potassium nitrate in counter-current to the gas current to separate nitrogen dioxide from chlorine while controlling the proportion of the washing liquor so as to ultimately obtain a solution of potassium nitrate in strong nitric acid, withdrawing said solution and re-using it in the conversion of fresh quantities of potassium chloride into potassium nitrate.

OSKAR KASELITZ.